(12) United States Patent
Nakano et al.

(10) Patent No.: US 6,665,598 B2
(45) Date of Patent: Dec. 16, 2003

(54) SYSTEM OF INFORMING PROCEDURES FOR ADJUSTING CONTROL PARAMETERS OF AN ELECTRIC POWER STEERING CONTROL APPARATUS

(75) Inventors: Jiro Nakano, Kariya (JP); Shinji Takeuchi, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 189 days.

(21) Appl. No.: 10/000,086

(22) Filed: Dec. 4, 2001

(65) Prior Publication Data

US 2002/0087241 A1 Jul. 4, 2002

(30) Foreign Application Priority Data

Dec. 5, 2000 (JP) ..................................... 2000-369649

(51) Int. Cl.[7] .......................... A01B 69/00; B62D 11/00; B62D 5/06; B62D 5/04; G05D 1/00
(52) U.S. Cl. ........................... 701/41; 701/42; 180/410; 180/443; 180/446; 116/31
(58) Field of Search ................. 701/41, 42; 116/31; 180/410, 443, 446

(56) References Cited

U.S. PATENT DOCUMENTS

| | | | | |
|---|---|---|---|---|
| 5,048,630 A | * | 9/1991 | Schaffer | 180/422 |
| 5,527,053 A | * | 6/1996 | Howard | 280/90 |
| 5,536,028 A | * | 7/1996 | Howard | 280/90 |
| 5,857,158 A | | 1/1999 | Zimmermann et al. | 701/33 |
| 5,970,251 A | | 10/1999 | Zimmermann et al. | 395/709 |
| 6,116,372 A | * | 9/2000 | Mukai et al. | 180/446 |
| 6,422,335 B1 | * | 7/2002 | Miller | 180/446 |
| 6,557,662 B1 | * | 5/2003 | Andonian et al. | 180/402 |

FOREIGN PATENT DOCUMENTS

| | | | |
|---|---|---|---|
| DE | 41 07 052 | 9/1992 | |
| DE | 197 36 231 | 2/1999 | |
| DE | 198 16 287 | 4/1999 | |
| EP | 0 266 704 | 5/1998 | |
| GB | 2 247 757 | 3/1992 | |
| GB | GB 2247757 A | * 3/1992 | ........... G05B/15/02 |

* cited by examiner

Primary Examiner—William A. Cuchlinski, Jr.
Assistant Examiner—Brian J Broadhead
(74) Attorney, Agent, or Firm—Oblon, Spivak, McClelland, Maier & Neustadt, P.C.

(57) ABSTRACT

An informing apparatus informs an operator of procedures for adjusting control parameters used in a control apparatus that controls an electric power steering apparatus based on various control parameter data. The power steering apparatus is used for the steering wheel of a vehicle. A storage portion stores various data. The data includes evaluation data, steering state data, control parameter data of the power steering control apparatus, and adjusting procedure data. The evaluation data is related to steering of the steering wheel. The steering state data represents the steering state when the evaluation data is obtained. The steering state data is related to the evaluation data. The control parameter data is related to the steering state data, and the evaluation data, and is being used when the evaluation data is obtained. The adjusting procedure data is used for adjusting the control parameter data such that the evaluation data is resolved. The evaluation data and the steering state data are inputted through a selector. A controller of the informing apparatus reads the adjusting procedure data of the control parameter data from the storage portion based on the evaluation data and the steering state data. The adjusting procedure data of the read control parameter data is outputted to a display.

11 Claims, 12 Drawing Sheets

| A | B1 | B2 | B3 | C | | |
|---|---|---|---|---|---|---|
| Sensory Evaluation | Vehicl Speed State | Steering State | Steering Speed State | Procedure 1 | Procedure 2 | Procedure 3 |
| Slow Return | Moving | Further Steering | Intermediate | Assist Map | Inertia Compensation Map | Inertia Compensation Vehicle Speed Gain Map |
| Slow Return | Moving | Reverse | Intermediate | Assist Map | Inertia Compensation Map | Inertia Compensation Vehicle Speed Gain Map |
| Slow Return | Moving | Maintain | None | Assist Map | Inertia Compensation Map | Inertia Compensation Vehicle Speed Gain Map |
| Slow Return | Moving | Further Steering | Quick | Assist Map | Inertia Compensation Map | Inertia Compensation Vehicle Speed Gain Map |
| Slow Return | Moving | Reverse | Quick | Assist Map | Inertia Compensation Map | Inertia Compensation Vehicle Speed Gain Map |
| Slow Return | Moving | Maintain | None | Assist Map | Inertia Compensation Map | Inertia Compensation Vehicle Speed Gain Map |
| Slow Return | Moving | Further Steering | Slow | Assist Map | Inertia Compensation Map | Inertia Compensation Vehicle Speed Gain Map |
| Slow Return | Moving | Reverse | Slow | Assist Map | Inertia Compensation Map | Inertia Compensation Vehicle Speed Gain Map |
| Slow Return | Moving | Maintain | None | Assist Map | Inertia Compensation Map | Inertia Compensation Vehicle Speed Gain Map |
| Heavy | Moving | Further Steering | Intermediate | Assist Map | Inertia Compensation Map | Inertia Compensation Vehicle Speed Gain Map |
| Heavy | Moving | Reverse | Intermediate | Assist Map | Inertia Compensation Map | Inertia Compensation Vehicle Speed Gain Map |
| Heavy | Moving | Maintain | None | Assist Map | Inertia Compensation Map | Inertia Compensation Vehicle Speed Gain Map |
| Heavy | Moving | Further Steering | Quick | Assist Map | Inertia Compensation Map | Inertia Compensation Vehicle Speed Gain Map |
| Heavy | Moving | Reverse | Quick | Assist Map | Inertia Compensation Map | Inertia Compensation Vehicle Speed Gain Map |
| Heavy | Moving | Maintain | None | Assist Map | Inertia Compensation Map | Inertia Compensation Vehicle Speed Gain Map |
| Heavy | Moving | Further Steering | Slow | Assist Map | Inertia Compensation Map | Inertia Compensation Vehicle Speed Gain Map |
| Heavy | Moving | Reverse | Slow | Assist Map | Inertia Compensation Map | Inertia Compensation Vehicle Speed Gain Map |
| Heavy | Moving | Maintain | None | Assist Map | Inertia Compensation Map | Inertia Compensation Vehicle Speed Gain Map |

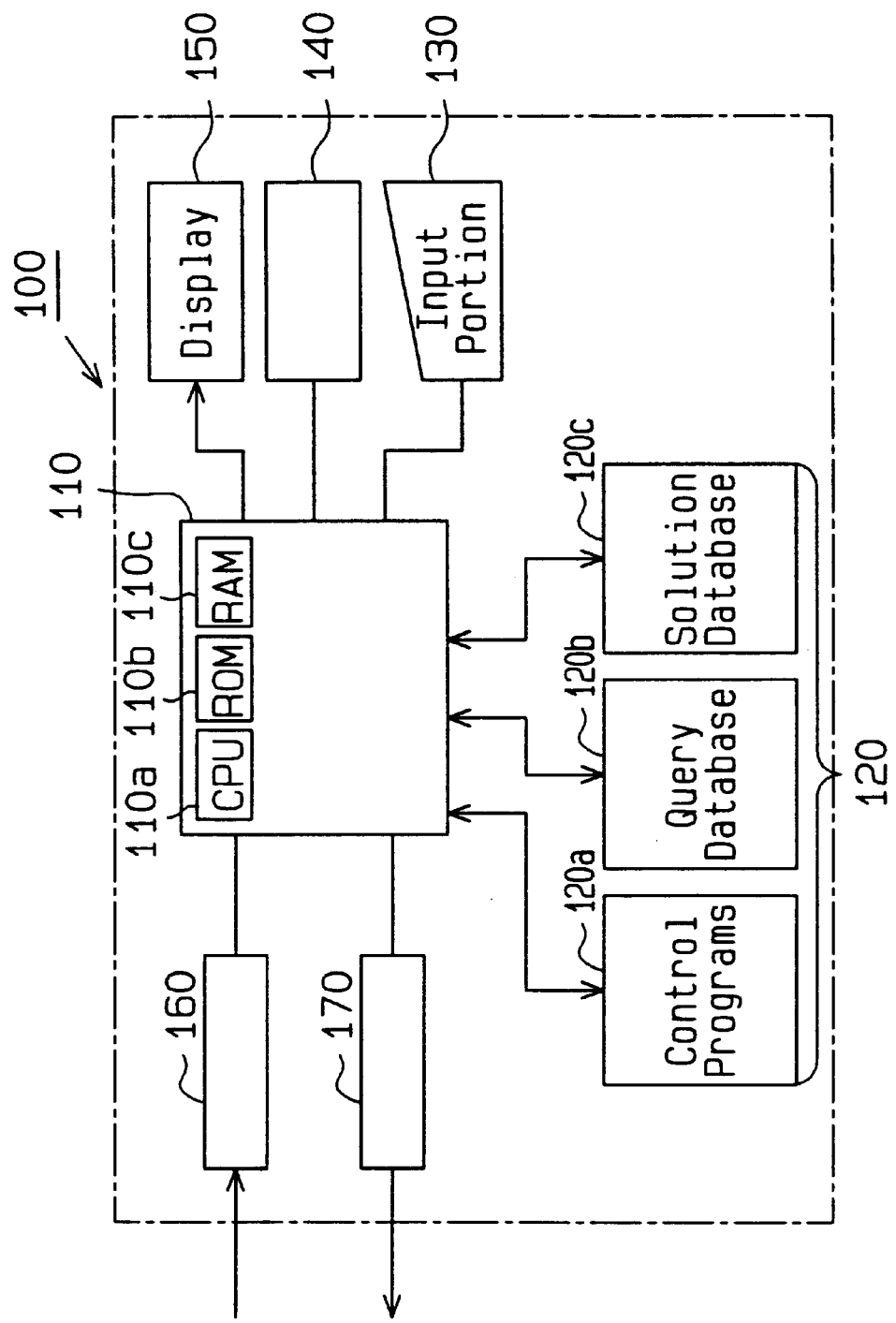

Fig.3

| Sensory Evaluation | Vehicle Speed State | Steering State | Steering Speed State | Procedure 1 | Procedure 2 | Procedure 3 |
|---|---|---|---|---|---|---|
| Slow Return | Moving | Further Steering | Intermediate | Assist Map | Inertia Compensation Map | Inertia Compensation Vehicle Speed Gain Map |
| Slow Return | Moving | Reverse | Intermediate | Assist Map | Inertia Compensation Map | Inertia Compensation Vehicle Speed Gain Map |
| Slow Return | Moving | Maintain | None | Assist Map | Inertia Compensation Map | Inertia Compensation Vehicle Speed Gain Map |
| Slow Return | Moving | Further Steering | Quick | Assist Map | Inertia Compensation Map | Inertia Compensation Vehicle Speed Gain Map |
| Slow Return | Moving | Reverse | Quick | Assist Map | Inertia Compensation Map | Inertia Compensation Vehicle Speed Gain Map |
| Slow Return | Moving | Maintain | None | Assist Map | Inertia Compensation Map | Inertia Compensation Vehicle Speed Gain Map |
| Slow Return | Moving | Further Steering | Slow | Assist Map | Inertia Compensation Map | Inertia Compensation Vehicle Speed Gain Map |
| Slow Return | Moving | Reverse | Slow | Assist Map | Inertia Compensation Map | Inertia Compensation Vehicle Speed Gain Map |
| Slow Return | Moving | Maintain | None | Assist Map | Inertia Compensation Map | Inertia Compensation Vehicle Speed Gain Map |
| Heavy | Moving | Further Steering | Intermediate | Assist Map | Inertia Compensation Map | Inertia Compensation Vehicle Speed Gain Map |
| Heavy | Moving | Reverse | Intermediate | Assist Map | Inertia Compensation Map | Inertia Compensation Vehicle Speed Gain Map |
| Heavy | Moving | Maintain | None | Assist Map | Inertia Compensation Map | Inertia Compensation Vehicle Speed Gain Map |
| Heavy | Moving | Further Steering | Quick | Assist Map | Inertia Compensation Map | Inertia Compensation Vehicle Speed Gain Map |
| Heavy | Moving | Reverse | Quick | Assist Map | Inertia Compensation Map | Inertia Compensation Vehicle Speed Gain Map |
| Heavy | Moving | Maintain | None | Assist Map | Inertia Compensation Map | Inertia Compensation Vehicle Speed Gain Map |
| Heavy | Moving | Further Steering | Slow | Assist Map | Inertia Compensation Map | Inertia Compensation Vehicle Speed Gain Map |
| Heavy | Moving | Reverse | Slow | Assist Map | Inertia Compensation Map | Inertia Compensation Vehicle Speed Gain Map |
| Heavy | Moving | Maintain | None | Assist Map | Inertia Compensation Map | Inertia Compensation Vehicle Speed Gain Map |

SYSTEM OF INFORMING PROCEDURES FOR ADJUSTING CONTROL PARAMETERS OF AN ELECTRIC POWER STEERING CONTROL APPARATUS

BACKGROUND OF THE INVENTION

The present invention relates to a system of informing procedures for adjusting the control parameters of an electric power steering control apparatus, which applies power to the steering system of an automobile for assisting steering action.

The recent advancements in the automobile technology have resulted in various types of electric components that control actuators based on information from sensors. The electric power steering control apparatus is one such component. A typical electric power steering system includes a torque sensor, which is attached to a steering shaft connected to a steering wheel. The torque sensor detects the steering torque. An electric power steering control apparatus computes an assist command current based on the detected steering torque and a vehicle speed detected by a vehicle speed sensor. Then, the control apparatus controls an electric motor so that the actual motor current, detected by a current sensor, is equal to the computed assist command current, thereby reducing the force required for steering.

The electric power steering control apparatus includes a controller, which is an electronic control unit (ECU), and operates according to a control program and control parameter data, which are stored in a read only memory (ROM) of the controller.

Various control parameter data, which is previously stored in the ECU, is adjusted for each vehicle. This adjustment is referred to as actual vehicle adaptation. The actual vehicle adaptation is performed during the development of a vehicle to adjust the various control parameter data such that the characteristics of the electric power steering control apparatus are adapted to the characteristics of the vehicle. In the actual vehicle adaptation for an electric power steering controller, several items of the steering feeling are determined. The items include the resistance of steering, the behavior of the steering wheel when it returns to the neutral position, the reduction of the vibration of the steering wheel, the response of steering, and the maneuverability of the vehicle. Through the actual vehicle adaptation, the performance of the electric power steering control apparatus and the steering feeling are improved.

In general, an electric power steering control apparatus refers to a great number of control parameters and integrates outputs from several control algorithms to determine a command torque (assist command current), which is sent to an electric motor. Thus, even if one control parameter is determined, the determined parameter must be adjusted after other control parameters are determined. That is, the control parameters influence one another in a complicated manner, which complicates the adaptation procedure.

Also, it is not easy to determine the correspondence between each of various control parameters and the items of the steering feeling. Therefore, the adaptation is performed by try and error and takes long time.

Accordingly, the adaptation requires high skills and experience. That is, the adaptation is a special procedure that can be performed only by skilled workers. Therefore, the adaptation cannot be performed on different types of vehicles at the same time and is not suitable for accelerated development of vehicles.

SUMMARY OF THE INVENTION

Accordingly, it is an objective of the present invention to provide a system of informing procedures for adjusting control parameters of an electric power steering control apparatus, which system constructs a database defining the relationship between control parameters and items of steering feeling and informs an operator of which of the control parameters should be adjusted in what manner in order to resolve problems regarding the steering feeling.

To achieve the foregoing and other objectives and in accordance with the purpose of the present invention, an informing apparatus for informing procedures for adjusting control parameters used in a control apparatus that controls an electric power steering apparatus based on various control parameter data is provided. The power steering apparatus is used for the steering wheel of a vehicle. The informing apparatus includes storing means, first input means, second input means, reading means, and output means. The storing data means stores evaluation data, steering state data, control parameter data of the power steering control apparatus, and adjusting procedure data. The evaluation data is related to steering of the steering wheel. The steering state data represents the steering state when the evaluation data is obtained. The steering state data is related to the evaluation data. The control parameter is related to the steering state data and the evaluation data, and is being used when the evaluation data is obtained. The adjusting procedure data is used for adjusting the control parameter data such that the evaluation data is resolved. The first input means inputs the evaluation data. The second input means inputs the steering state data. The reading means reads the adjusting procedure data of the control parameter data from the storage means based on the evaluation data and the steering state data. The output means outputs the adjusting procedure data of the read control parameter data.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a block diagram showing the informing apparatus;

FIG. 3 is a chart showing a query database;

DETAILED DESCRIPTION OF THE PREFERRED EMBODIMENTS

An apparatus 100 for informing procedures for adjusting control parameters according to a first embodiment of the present invention will now be described with reference to FIGS. 1 to 12. The apparatus 100 is used in a vehicle.

First, an electric power steering control apparatus (electronic control unit: ECU) 20, which is controlled by the apparatus 100, will be described with reference to FIGS. 1 and 8 to 12.

Figure 1:
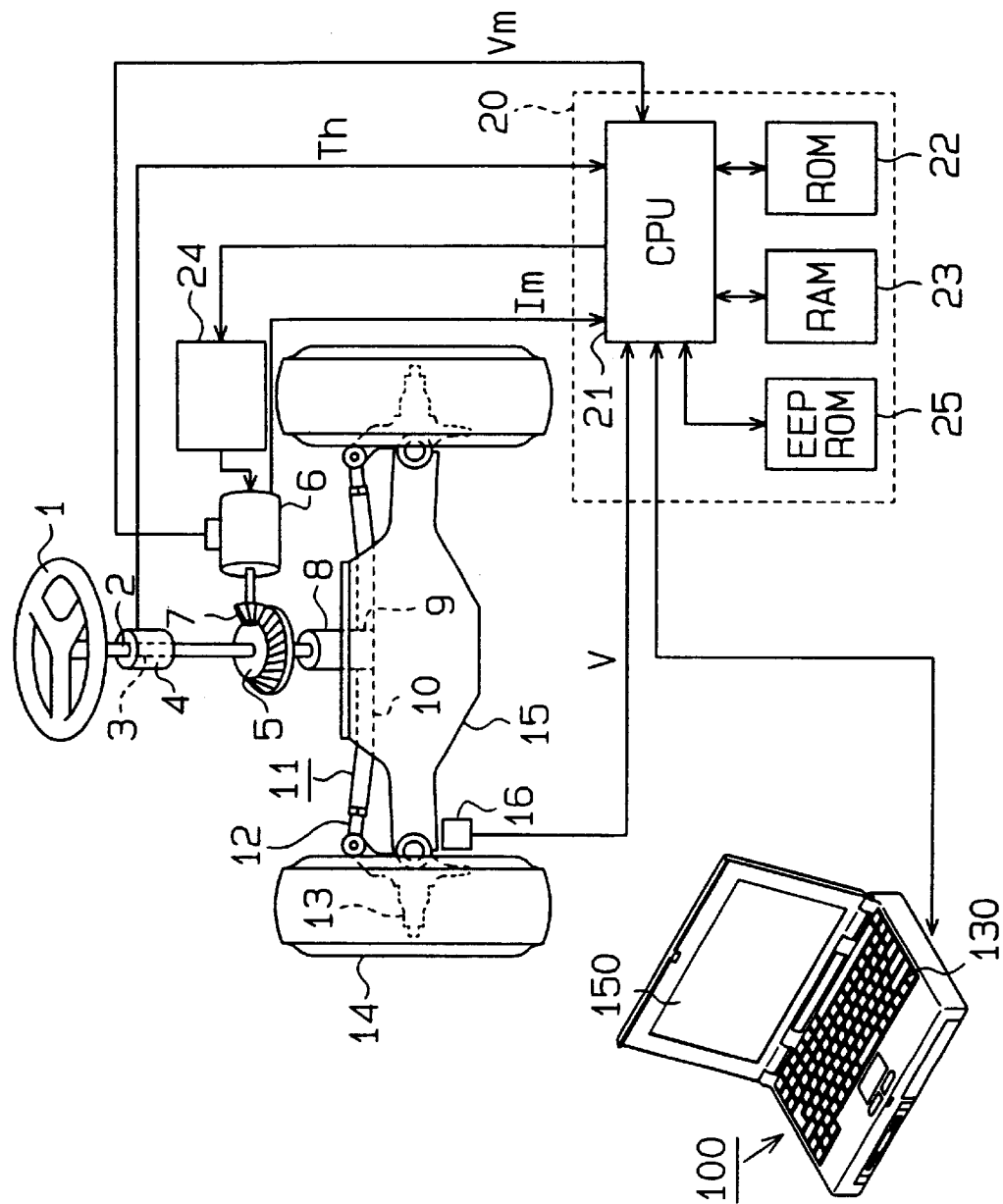
FIG. 1 is a diagrammatic view showing an electric power steering control apparatus and an apparatus for informing procedures for adjusting control parameters according to a first embodiment of the present invention.

FIG. 1 diagrammatically shows the steering control apparatus 20 and an electric power steering system.

A steering wheel 1 is coupled to a steering shaft 2. A torsion bar 3 is also coupled to the steering shaft 2. A torque sensor 4 is attached to the torsion bar 3. When the torsion bar 3 receives force due to rotation of the steering shaft 2, the torsion bar 3 is twisted in accordance with the applied force. The twist of the torsion bar 3, or the steering torque applied to the steering wheel 1, is detected by the torque sensor 4. The output of the torque sensor 4 is sent to the steering control apparatus 20.

A transmission mechanism, which is a reduction unit 5 in this embodiment, is attached to the steering shaft 2. The gear of the reduction unit 5 is meshed with a gear 7 attached to the rotary shaft of a motor 6. Further, the reduction unit 5 includes a pinion shaft 8. A pinion 9 is located at the distal end of the pinion shaft 8. The pinion 9 is meshed with a rack 10. The rack 10 and the pinion 9 form a rack-and-pinion mechanism 11.

A tie rod 12 is fixed to each end of the rack 10. A knuckle 13 is pivotally coupled to each tie rod 12. Front wheels 14 are coupled to the knuckles 13. One end of each knuckle 13 is pivotally coupled to a cross member 15.

Therefore, when the motor 6 rotates, the speed of the rotation is reduced by the reduction unit 5 and is transmitted to the rack 10. The rack 10 changes the orientation of the front wheels 14 through the knuckles 13, thereby changing the moving direction of the vehicle. A vehicle speed sensor 16 is located in the vicinity of one of the front wheels 14.

The electric construction of the steering control apparatus 20 will now be described with reference to FIG. 1.

The torque sensor 4 outputs a signal that represents the steering torque Th applied to the steering wheel 1. The vehicle speed sensor 16 outputs a detection signal that represents the rotation speed of the corresponding front wheel 14. The rotation speed of the front wheel 14 represents the vehicle speed V.

Figure 8:
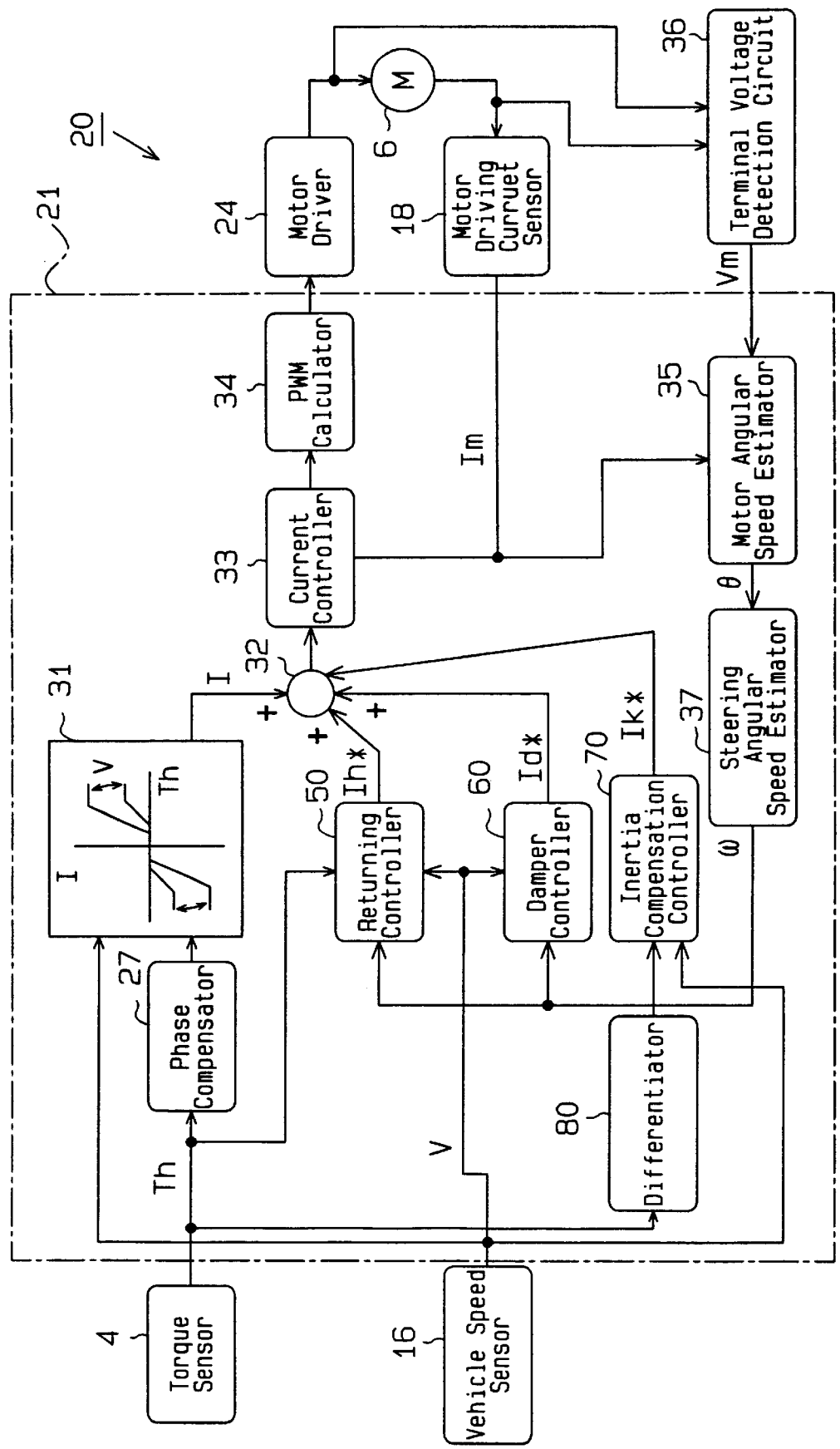
FIG. 8 is a functional block diagram showing the central processing unit of the electric power steering control apparatus.

As shown in FIG. 8, the steering control apparatus 20 is connected to a motor driving current sensor 18. The current sensor 18 detects driving current (motor current Im) supplied to the motor 6. The motor current Im corresponds to the motor current value. The motor driving current sensor 18 sends a signal representing the motor current Im to the steering control apparatus 20. A terminal voltage detection circuit 36 outputs the voltage Vm between terminals of the motor 6 to the steering control apparatus 20. The voltage Vm will be referred to as the motor terminal voltage.

As shown in FIG. 1, the steering control apparatus 20 includes a control means, which is a central processing unit (CPU) 21 in this embodiment, a read only memory (ROM) 22, a random access memory (RAM) 23, an electrically erasable programmable read-only memory (EEPROM) 25, and a communication controller (not shown). The steering control apparatus 20 communicates with the apparatus 100 through the communication controller. The EEPROM 25 stores various programs executed by the CPU 21. The RAM 23 temporarily stores the results of computation of the CPU 21.

In various control procedures, such as a steering assist control procedure, a damper compensation control procedure, a steering wheel return compensation control procedure, the CPU 21 inputs detection signals from various sensors and computes the motor command current value based on the detection signals and sends the computed current value to a motor driver 24. Accordingly, the motor driver 24 drives the motor 6.

Control procedures executed by the CPU 21 will now be described.

FIG. 8 is a functional block diagram of the CPU 21 and shows functions that are executed through programs. FIG. 8 does not represent the hardware construction.

The steering torque detected by the torque sensor 4 is subjected to phase compensation by a phase compensator 27 to improve the stability of the assist system. The phase compensator 27 executes a predetermined functional computation based on a constant for phase compensation and the detected steering torque, thereby compensating for the phase of the steering torque. After its phase is compensated, the steering torque Th is sent to an assist current calculator 31, which calculates the assist current command value. Also sent the assist current calculator 31 is the vehicle speed V detected by the vehicle speed sensor 16.

The assist current calculator 31 computes an assist current command value I based on an assist map, which is previously stored in the EEPROM 25. The assist current command value I corresponds to the vehicle speed V and the steering torque Th.

Figure 9:
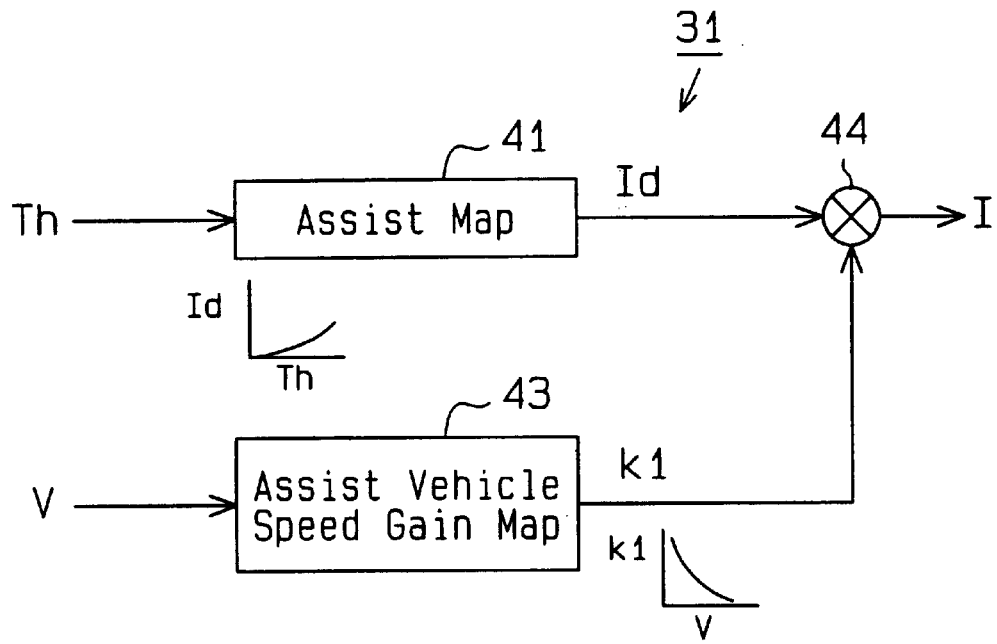
FIG. 9 is a functional block diagram showing an assist controller of the electric power steering control apparatus.

As shown in FIG. 9, the assist current calculator 31 reads the value of an assist current Id from an assist map 41 based on the steering torque Th. The assist current Id, which has the read value, is sent to a multiplier 44.

The assist current calculator 31 reads the value of an assist vehicle speed gain k1 from a vehicle speed gain map 43 for assist based on the vehicle speed V. The assist vehicle speed gain k1, which has the read value, is sent to the multiplier 44.

The multiplier 44 multiplies the assist current Id by the assist vehicle speed gain k1, thereby obtaining the assist current command value I. The multiplier 44 sends the obtained assist current command value I to an adder 32 shown in FIG. 8.

The adder 32 adds an adjusted steering wheel return current Ih* and a damper current Id* and a multiplication value Ik* to the assist current command value I. The resultant is supplied to a current controller 33. Based on a signal that corresponds to the deviation between the output of the adder 32 and the actual motor current (motor driving current) Im, which is detected by the motor driving current sensor 18, the current controller 33 computes a proportional integral (PI) control value and a proportional integral and differential (PID) control value, which are known in the art. The current controller 33 obtains the PI control value and the PID control value based on various constants, which correspond to control parameter data, and the motor current deviation through execution of a predetermined function. The current controller 33 sends the PI value and the PID value to a pulse width modulation (PWM) calculator 34.

The PWM calculator 34 executes a PWM calculation according to the above control values and sends the resultant to the motor driver 24. As a result, the motor 6 is driven by the motor driver 24 and produces an appropriate assisting force.

Based on the actual motor current Im of the motor 6, which is detected by the motor driving current sensor 18, and the motor terminal voltage Vm detected by the terminal voltage detection circuit 36 of the motor 6, an angular speed estimator 35 estimates the motor angular speed θ by using the following equation.

$$\theta = [Vm - (R+LS)Im]/Ke$$

R represents the motor resistance, L represents the motor inductance, Ke represents the motor back electromotive force constant, and S represents a differential operator.

A steering angular speed estimator 37 divides the estimated motor angular speed θ by the reduction ratio G of the reduction unit 5, thereby estimating the estimated steering angular speed ω (ω=θ/G). The estimated steering angular speed ω is sent to a steering wheel return controller 50 and the damper controller 60. The vehicle speed V, which is detected by the vehicle speed sensor 16, is set to the return controller 50 and the damper controller 60.

The steering wheel return controller 50 will now be described.

The return controller 50 improves the characteristics of the steering wheel 1 when it returns to the neutral position after being steered while the vehicle is moving at a relatively low speed. The return controller 50 outputs an adjusted steering wheel return current Ih*, which corresponds to the vehicle speed V and the estimated steering angular speed ω. The adjusted steering wheel return current Ih* is used for assisting the steering wheel 1 to return to the neutral position when necessary.

Figure 11:
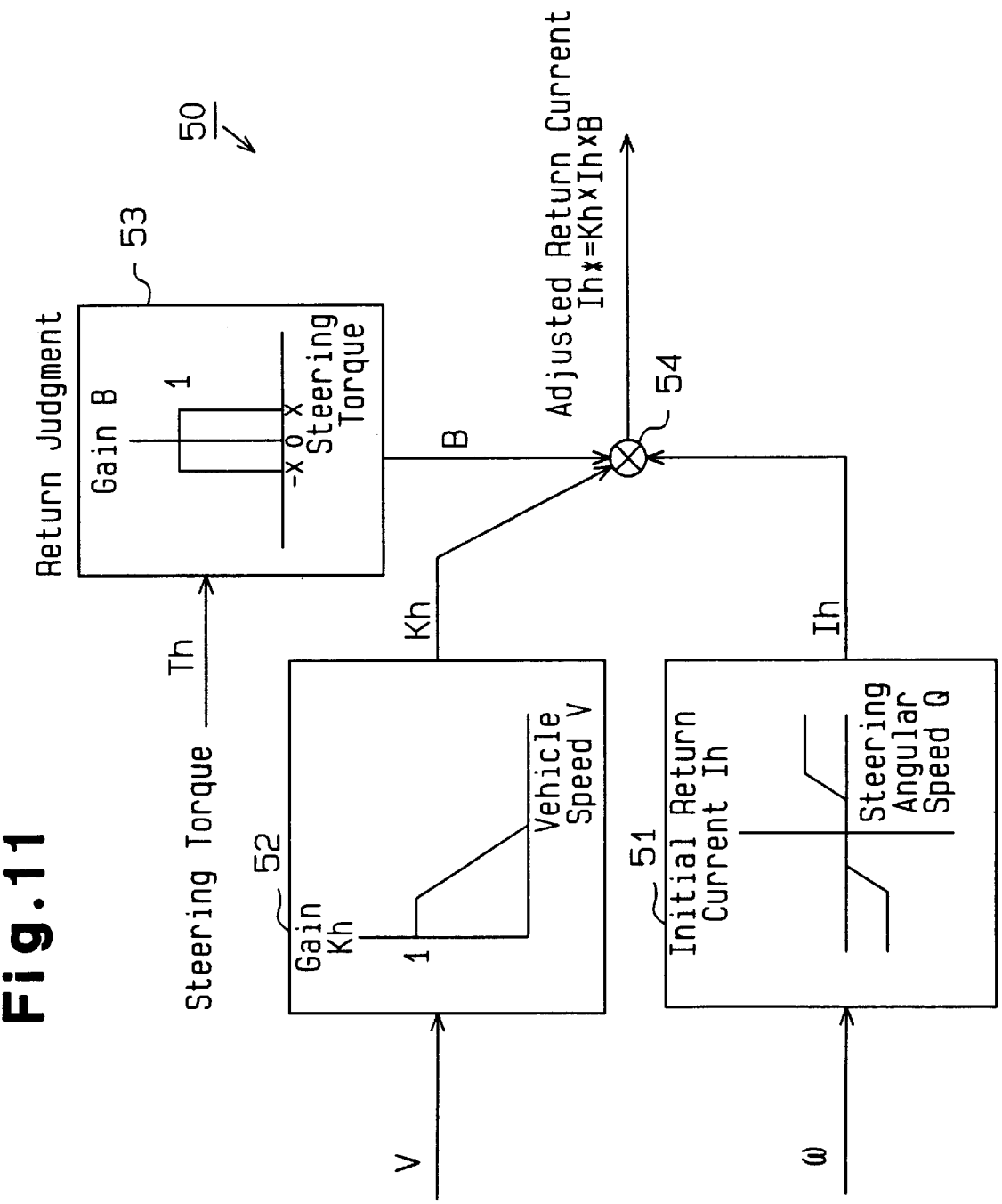
FIG. 11 is a functional block diagram showing a steering wheel return controller.

FIG. 11 is a functional block diagram for performing a return computation of the return controller 50. The return controller 50 includes a return current calculator 51, a return compensation vehicle speed gain calculator 52, a return judgment portion 53, and a multiplier 54. The return current calculator 51 has a return compensation map. When receiving the estimated steering angular speed ω, the return current calculator 51 refers the return compensation map and reads the initial return current Ih and sends the initial return current Ih to the multiplier 54. The initial return current Ih is used to help calculated an adjusted return current Ih* used for assisting steering motion along the rotating direction of the steering wheel 1.

When receiving the vehicle speed V, the return compensation vehicle speed gain calculator 52 refers the return compensation vehicle speed gain map and reads the vehicle speed gain Kh. The return compensation vehicle speed gain calculator 52 sends the vehicle speed gain Kh to the multiplier 54. The value of the vehicle speed gain Kh is determined such that the steering wheel return current is zero when the vehicle is moving at intermediate speed and high speed. In other words, the value of the vehicle speed gain Kh is determined such that the steering wheel return control procedure is executed only when the vehicle is moving at low speed.

The return judgment portion 53 has a steering wheel return determination map. When receiving the steering torque Th, the return judgment portion 53 refers to the map and outputs the gain B the value of one if the torque Th is close to zero. If the absolute value of the steering torque is greater than a threshold value X (|Th|>X, (X>0)), the return judgment portion 53 sends the gain B the value of zero to the multiplier 54. That is, the return judgment portion 53 judges that the steering wheel 1 needs be returned to the neutral position when the absolute value of the steering torque Th is equal to or less than the threshold value X. When the absolute value of the steering torque Th exceeds the threshold value X, the return judgment portion 53 judges that the steering wheel 1 is being turned or that the position of the steering wheel 1 needs to be maintained. The multiplier 54 does multiplication of Ih, Kh, and B, and sends the resultant, or an adjusted steering wheel return current Ih*, to the adder 32.

Accordingly, if the return judgment portion 53 judges that the steering wheel 1 is being returned to the neutral position when the vehicle is moving at a low speed, the adjusted steering wheel return current Ih* is added to the assist current, which improves the returning performance of the steering wheel 1.

The damper controller 60 will now be described.

The damper controller 60 improves the convergence of the yaw when the vehicle is moving at intermediate speed or high speed. The damper controller 60 outputs a damper current Id*, which acts in the opposite direction of the rotating direction of the steering wheel 1, according to the vehicle speed V and the estimated steering angular speed ω, thereby limiting the current supplied to the motor 6.

Figure 12:
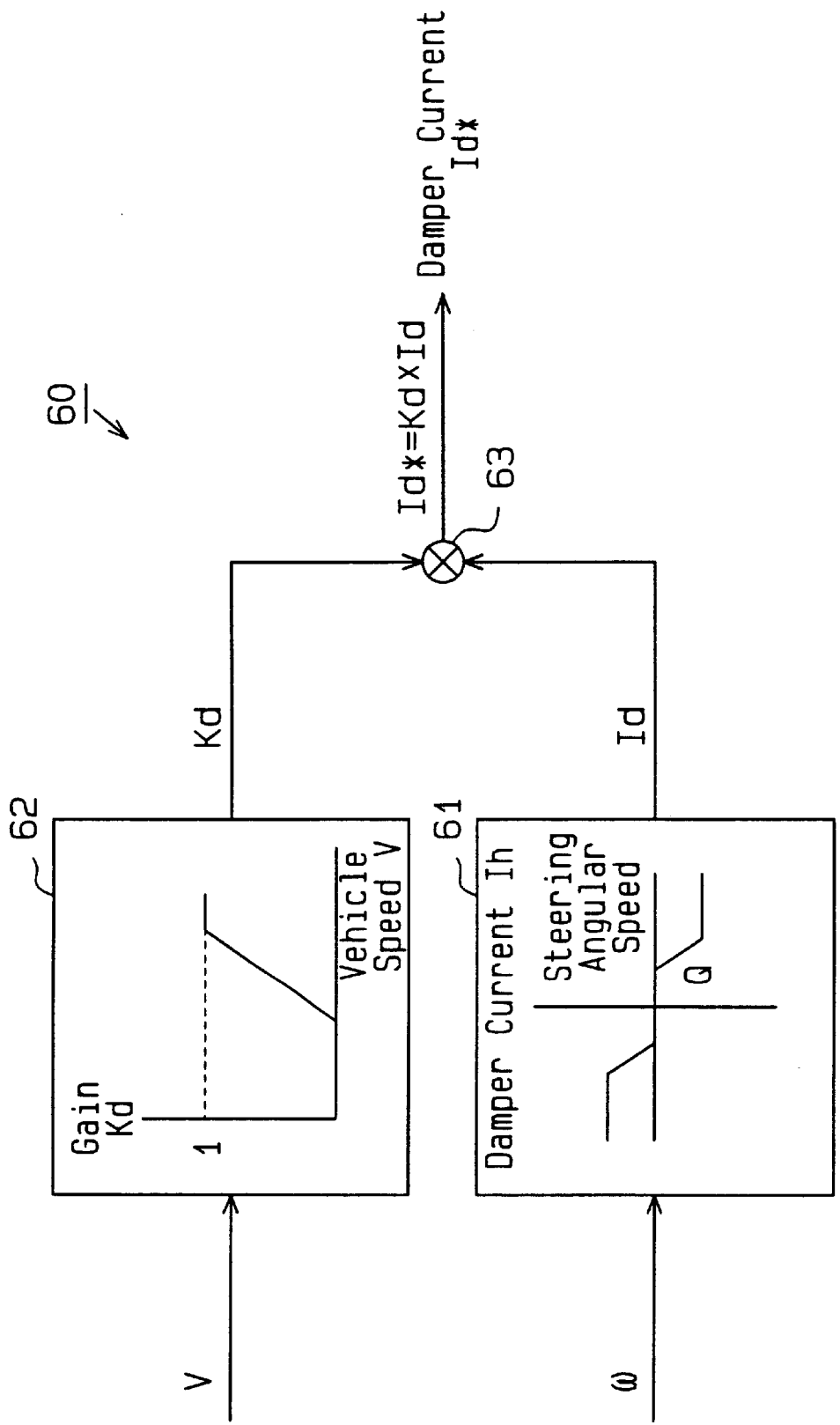
FIG. 12 is a functional block diagram showing a damper controller.

FIG. 12 is a functional block diagram showing the computation procedure of the damper current. The damper controller 60 includes a damper current calculator 61, a vehicle speed gain calculator 62 for damper compensation, and a multiplier 63. The damper current calculator 61 includes a damper current map. When receiving the estimated steering angular speed ω, the damper current calculator 61 refers to the damper current map and reads the damper current Id. The damper current calculator 61 sends the damper current Id to the multiplier 63. The damper current Id is set to decrease the steering angular speed and is thus opposite in polarity from the steering wheel return control procedure.

When receiving the vehicle speed V, the vehicle speed gain calculator 62 refers the damper gain map and reads the damper gain Kd. The vehicle speed gain calculator 62 sends the damper gain Kd to the multiplier 63. The value of the damper gain Kd is determined such that the damper current is zero when the vehicle is moving at low speed and is determined to activate the damper control procedure when the vehicle is moving at intermediate speed or high speed.

The multiplier 63 multiplies the damper current Id by the damper gain Kd to obtain a damper current Id*. The multiplier 63 sends the damper current Id* to the adder 32. Therefore, when the vehicle is moving at intermediate speed or high speed, the damper controller 60 adds the damper current Id* to the assist current command value I, which improves the damper characteristics of the steering wheel 1 when the vehicle is moving at intermediate speed or high speed.

The inertia compensation controller 70 will now be described.

The inertia compensation controller 70 performs an inertia compensation control procedure for compensating for the influence of the moment of inertia in the mechanisms (including the motor 6) in the electric power steering apparatus. When the vehicle is slightly steered after moving in a straight line, the moment of inertia of the mechanisms applies force that is opposite to the steering direction to the steering wheel 1 and thus deteriorates the steering feeling. The inertia compensation control procedure prevents such deterioration. For example, the inertia compensation controller 70 controls the power steering apparatus as if the rotor inertia of the motor 6 is reduced. When the vehicle is steered abruptly, the motor 6 may not follow the rotation of the steering wheel 1, which makes the steering feeling heavy. In such cases, the inertia compensation controller 70 lightens the steering feeling. Also, the inertia compensation controller 70 permits the steering wheel 1 to be returned to the neutral position when the driver lets go the steering wheel 1.

As shown in FIG. 8, a differentiator 80 forms the derivative of the steering torque Th from the torque sensor 4. The differentiator 80 then sends the differentiation value dTh/dt to the inertia compensation controller 70.

The inertia compensation controller 70 inputs the differentiation value dTh/dt and the vehicle speed V. Also, the inertia compensation controller 70 determines the inertia compensation torque Ik from the differentiation value dTh/dt and determines the inertia compensation vehicle speed gain k2 from vehicle speed V, then multiplies the inertia compensation torque Ik by the inertia compensation vehicle speed gain k2 to obtain a multiplication value Ik*. The inertia compensation controller 70 sends the multiplication value Ik* to the adder 32.

Figure 10:
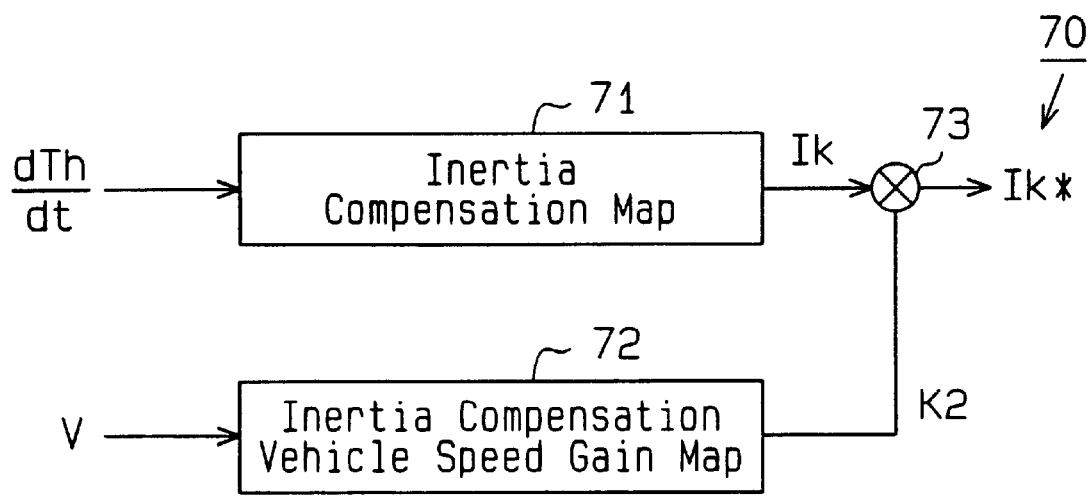
FIG. 10 is a functional block diagram showing an inertia compensation controller.

As shown in FIG. 10, the inertia compensation controller 70 includes an inertia compensation map 71, an inertia compensation vehicle speed gain map 72, and a multiplier 73. Based on the steering torque differentiation value dTh/dt, the inertia compensation controller 70 reads the inertia compensation torque Ik by referring the inertia compensation map 71. The inertia compensation controller 70 sends the inertia compensation torque Ik to the multiplier 73.

Based on the vehicle speed V, the inertia compensation controller 70 reads an inertia compensation vehicle speed gain k2 by referring the inertia compensation vehicle speed gain map 72. The inertia compensation controller 70 sends the inertia compensation vehicle speed gain k2 to the multiplier 73. The multiplier 73 multiplies the inertia compensation torque Ik by the inertia compensation vehicle speed gain k2 to obtain the multiplication value Ik*. The controller 70 sends the multiplication value Ik* to the adder 32. The multiplication value Ik* is added to the assist current command value I.

The operations of the control parameter adjusting procedure informing apparatus 100 that are related to the electric power steering control apparatus 20 will now be described. FIG. 2 is an electric block diagram showing the apparatus 100.

The size of the apparatus 100 is comparable to that of an A4-size personal notebook computer. The apparatus 100 is portable so that it can be used when adjusting the control parameters to each actual vehicle.

The apparatus 100 includes a controller 110, a memory portion 120, an input portion 130, a selector 140, and a display 150. The controller 110 includes a central processing unit (CPU) 110a, a read only memory 110b, a random access memory 110c. The memory portion 120 includes a hard disk that stores various control programs and various data. The input portion 130 includes a keyboard for inputting information. The selector 140 includes a pointing device, which is, for example, a mouse, for selecting necessary data from the data stored in the memory portion 120. The display 150 is, for example, a liquid crystal display and displays the selected data.

The CPU 110a forms a reading means, and the display 150 forms output means and displaying means. The selector 140 forms first input means and second input means.

The memory portion 120 includes a first memory 120a, which stores various control programs such as an expert control program, a second memory 120b, which stores a query database used when the expert control program is executed, and a third memory 120c, which stores a solution database.

The databases used for executing the expert control program will now be described. As shown in FIG. 3, the query database includes evaluation data, which is sensory evaluation data A in this embodiment, steering state data, which is vehicle speed condition data B1 in this embodiment, another steering state data, which is steering condition data B2 in this embodiment, and another steering state data, which is steering speed condition data B3 in this embodiment, and control parameter data C, which includes map data and constant data.

Hereinafter, the evaluation data, the sensory evaluation data, the steering state data, the control parameter data, the vehicle speed condition data, the steering condition data, and the steering speed condition data will be referred to as evaluation, sensory evaluation, steering state, control parameter, vehicle speed condition, steering condition, and steering speed condition, respectively. The map data and the constant data will be referred to as map and constant.

The sensory evaluation data A is an evaluation made by an operator, or a driver, during manipulation of the steering wheel 1. The sensory evaluation data A is related to the control apparatus 20. The sensory evaluation includes, for example, whether the steering is heavy, whether the steering quickly returns to the neutral position, whether the steering is light, and whether the steering is not smooth.

The vehicle speed condition data B1 represents the speed of the vehicle when the vehicle is steered and includes states such as "halt" and "moving".

The steering condition data B2 represents the state of the steering and includes states such as "further steering", "reverse" and "maintain".

The steering speed condition data B3 represents the steering speed. The steering speed condition data B3 includes several stages such as "slow", "intermediate" and "quick" the steering speed increases in this order.

The maps and constants include the following items (1) to (4).

(1) The constant that is used by the phase compensator 27 when compensating the phase of the steering torque.

(2) The assist map 41 and the assist vehicle speed gain map 43, which are used by the assist current calculator 31.

(3) The return compensation map and the return compensation gain map, which are used by the steering wheel return controller 50.

(4) The damper current map and the damper gain map, which are used by the damper controller 60.

As shown in FIG. 3, the sensory evaluation data A, the vehicle speed condition data B1, the steering condition data B2, and the steering speed condition data B3 are related to one another. Each item of the sensory evaluation data A is related to control parameters C of the steering control apparatus 20. In FIG. 3, each item of the sensory evaluation data A corresponds to items of three control parameters C. Alternatively, only one control parameter C may be used.

The solution database includes an adjusting procedure database and a steering feeling database.

The adjusting procedure database is formed by various procedures for adjusting the control parameters.

The adjusting procedures in the adjusting procedure database are related to the control parameters C in the query database such that an adjusting procedure that eliminates the sensory evaluation can be selected.

Each item of the steering feeling database, which represents one type of steering feeling, is related to one of the adjusting procedures, which corresponds to a set of items in the control parameters C in the query database. The steering feeling includes a first steering feeling and a second steering feeling. The first steering feeling occurs when the selected adjusting procedure is applied to the electric power steering control apparatus 20. The second steering feeling occurs if a procedure that is opposite to the selected adjusting procedure is applied.

For example, if the first steering feeling includes items such as "heavy", "less play", "not smooth", "steering limit" or "increasing responsivity". The second steering feeling includes items such as "light", "unclear neutral position (N)", "increasing friction". The first feelings are different from the second feelings.

As shown in FIG. 2, the apparatus 100 according to the first embodiment includes a first memory 120*a*. The first memory 120*a* stores a control program that also function as control parameter determining means. The controller 110 of the apparatus 100 includes a receiver 160 and a transmitter 170, which are connected to the steering control apparatus 20 for exchanging data.

The apparatus 100 will now be described.

Figure 4:
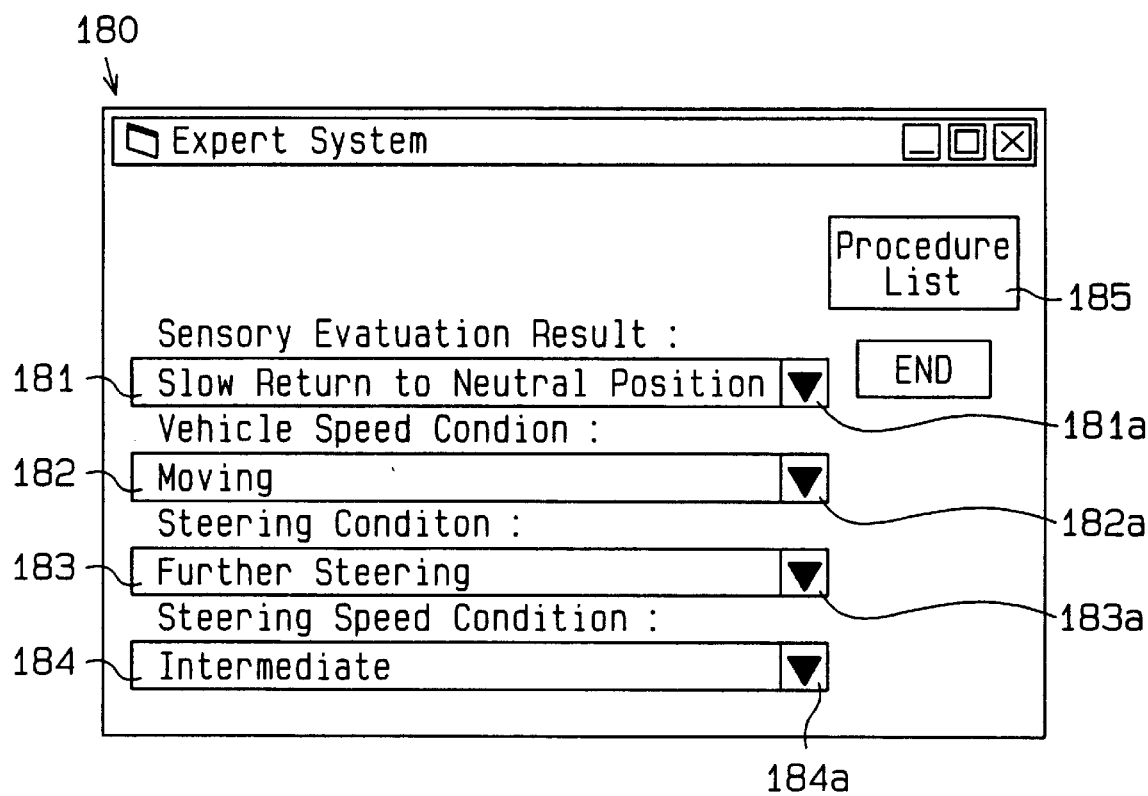
FIG. 4 illustrates a display showing the results of a sensory test and guidance for inputting items of steering conditions.

When an operator wishes to change the steering feeling of a vehicle that has the power steering control apparatus 20, the operator manipulates the input portion 130 to start the expert control program. Then, an input window 180, an example of which is shown in FIG. 4, is displayed on the display 150. The input window 180 shows the sensory evaluation and the steering conditions.

The input window 180 has a sensory evaluation input box 181, a vehicle speed condition input box 182, a steering condition input box 183, and a steering speed condition input box 184. Buttons 181*a*, 182*a*, 183*a*, 184*a* are located adjacent to the boxes 181 to 184, respectively. Each of the buttons 181*a* to 184*a* has an inversed triangle mark.

The operator manipulates the selector 140 to move a cursor (not shown) to the button 181*a* of the sensory evaluation box 181 then clicks the selector 140. Then, a list of candidates of sensory evaluation is shown. The list includes all the items in the sensory evaluation data A of the query database. For example, the candidate items include "heavy", "slow return to neutral position", "light", and "not smooth".

The driver (operator) selects one item that corresponds to the actual steering feeling from the list by clicking the pointing device.

Hereinafter, clicking of the pointing device after moving the cursor to a certain display area or button will simply be referred to clicking.

The operator then manipulates the selector 140 to move the cursor to the button 182*a* of the vehicle speed condition input box 182 and clicks the selector 140. Then, a list of candidates of vehicle speed condition items is shown. The list includes all the items in the vehicle speed condition data B1 of the query database. For example, the candidate items include "halt" and "moving". The operator clicks an item that corresponds to the actual vehicle speed condition from the list.

The operator manipulates the selector 140 to move the cursor to the button 183*a* of the steering condition input box 183 and clicks the selector 140. Then, a list of candidates of steering condition items is shown. The list includes all the items in the steering condition data B2 of the query database. For example, the candidate items include "further steering", "reverse" and "maintain". The operator clicks an item that corresponds to the steering condition from the list.

The operator manipulates the selector 140 to move the cursor to the button 184*a* of the steering speed condition input box 184 and clicks the selector 140. Then, a list of candidates of steering speed condition items is shown. The list includes all the items in the steering speed condition data B3 of the query database. For example, the candidate items include "slow", "intermediate" and "quick". The operator clicks an item that corresponds to the steering speed condition from the list.

Figure 5:
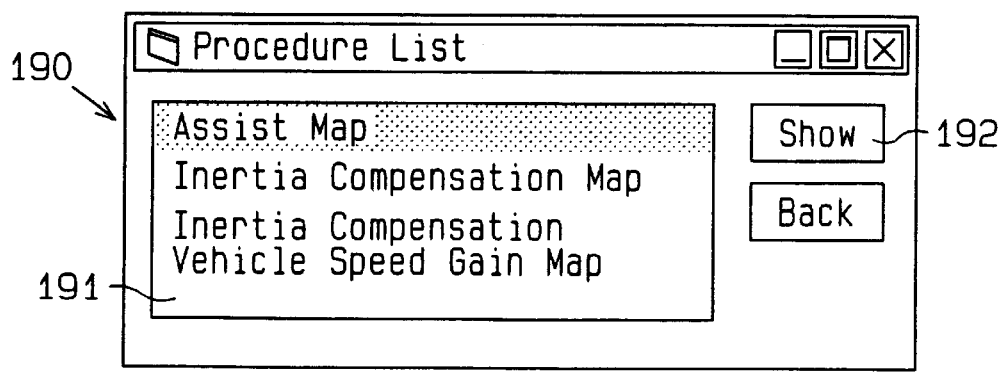
FIG. 5 illustrates the display showing a list of procedures.

Then, the operator manipulates the selector 140 to move the cursor to a procedure list button 185 and clicks the selector 140. The CPU 110*a* uses the inputted items from the boxes 181 to 184 as AND conditions and retrieves a corresponding set of items from the control parameters C from the second memory 120*b*. The CPU 110*a* shows a procedure list window 190, an example of which is shown in FIG. 5, on the display 150. The procedure list window 190 includes the retrieval results on a list 191.

In the example of FIG. 4, "slow return to neutral position", "moving", "further steering", and "intermediate" are inputted in the sensory evaluation input box 181, the vehicle speed condition input box 182, the steering condition input box 183 and the steering speed condition input box 184. This represents that a sensory evaluation of "slow return to neutral position" was obtained when the steering wheel was being steered "further" at the "intermediate" speed while the vehicle is "moving". FIG. 5 shows the result of the retrieval of the control parameters C for changing the sensory evaluation. That is, in the example of FIG. 5, the assist map, the inertia compensation map, and the inertia compensation vehicle speed gain map are the control parameters C that are related to the sensory evaluation "slow return to neutral position".

Figure 6:
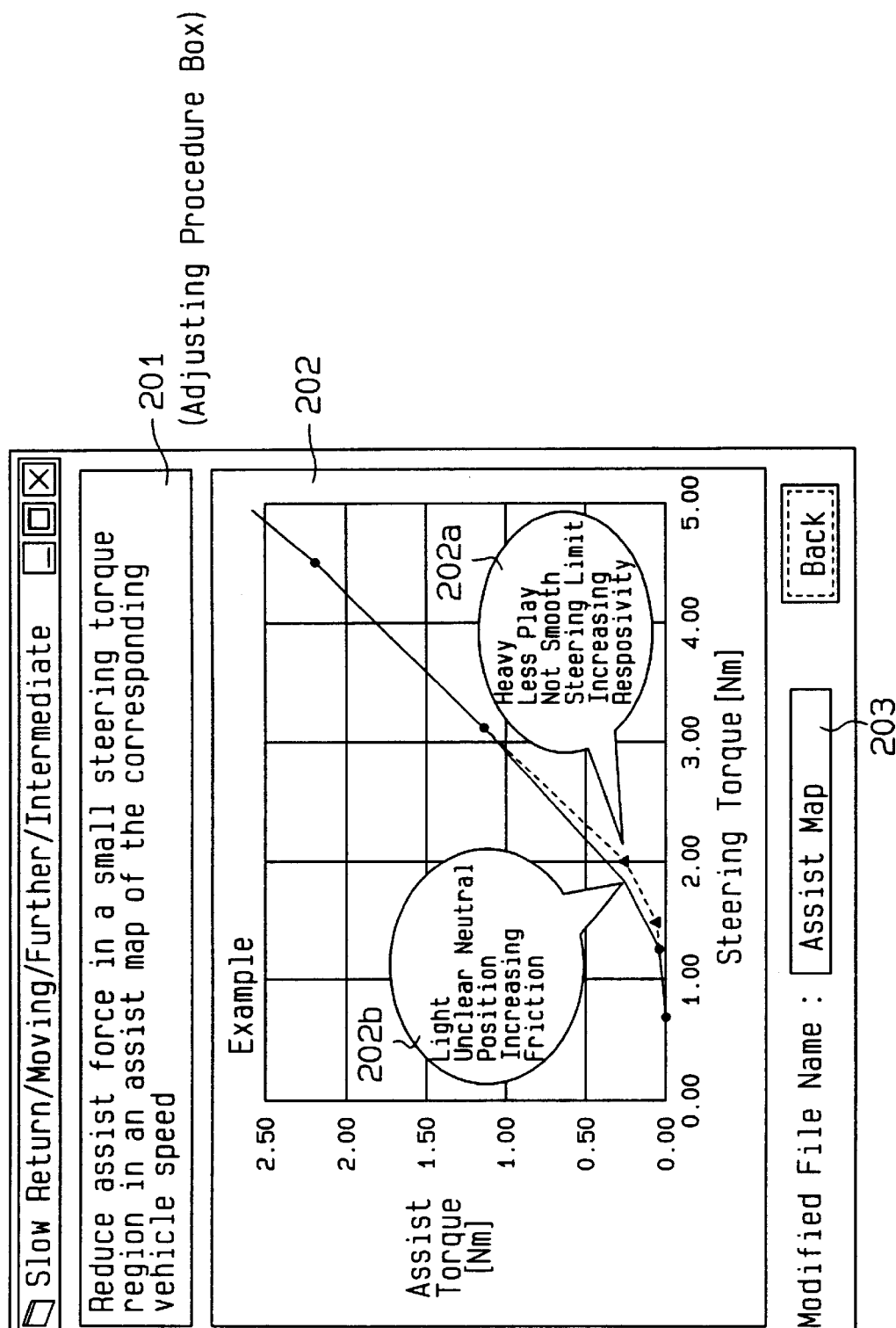
FIG. 6 illustrates the display showing a solution.

If the operator manipulates the selector 140 and clicks the part of "assist map" on the list 191, and then clicks a show button 192, the CPU 110*a* shows a solution window 200 on the display 150 as shown in FIG. 6. The solution window 200 shows an adjusting procedure.

The CPU 110*a* retrieves an adjusting procedure that is related to the selected control parameter C (in this case, the assist map) from the adjusting procedure database. The CPU 110*a* then shows the result of the retrieval, or selected adjusting procedure, in an adjusting procedure display box 201 on the solution window 200. If the selected parameter C is a map, the CPU 110*a* shows a graph representing the map in a graph box 202 on the solution window 200. If the selected control parameter C is not a map but is a constant, no graph is shown in the graph box 202. The CPU 110*a* shows the name of the selected control parameter C in a control parameter box 203 on the solution window 200.

The CPU 110*a* retrieves the first and second steering feelings that are related to the retrieved adjusting procedure from the steering feeling database and shows the retrieval result in display areas 202*a*, 202*b*, which are located in appropriate positions on the graph box 202. If a constant is selected as the control parameter C, the first and second steering feelings are shown in the display areas 202*a*, 202*b*, respectively, with no graph shown in the graph box 202.

In this manner, the display 150 displays an adjusting procedure that corresponds to the selected control parameter C, a steering feeling that will occur when the adjusting procedure is applied to the control apparatus 20 (first steering feeling), and a steering feeling that will occur if an adjusting procedure that is opposite to the selected procedure is applied (second steering feeling).

As a result, the operator will know how to adjust the control parameter C.

The operation of the apparatus 100 when it functions as a control parameter adapter will now be described.

In the following description, the apparatus 100 is connected to a communication controller (not shown) of the steering control apparatus 20 (hereinafter referred to as ECU 20) through a communication cable.

The first memory 120a stores a program for controlling an adaptation control parameter. The operator manipulates the input portion 130 to start the adaptation control parameter control program.

Subsequently, when the operator manipulates the input portion 130, the ECU 20 directly accesses the EEPROM 25 and reads a control parameter that needs to be adjusted (control parameter data). The read control parameter is shown on the display 150.

Figure 7:
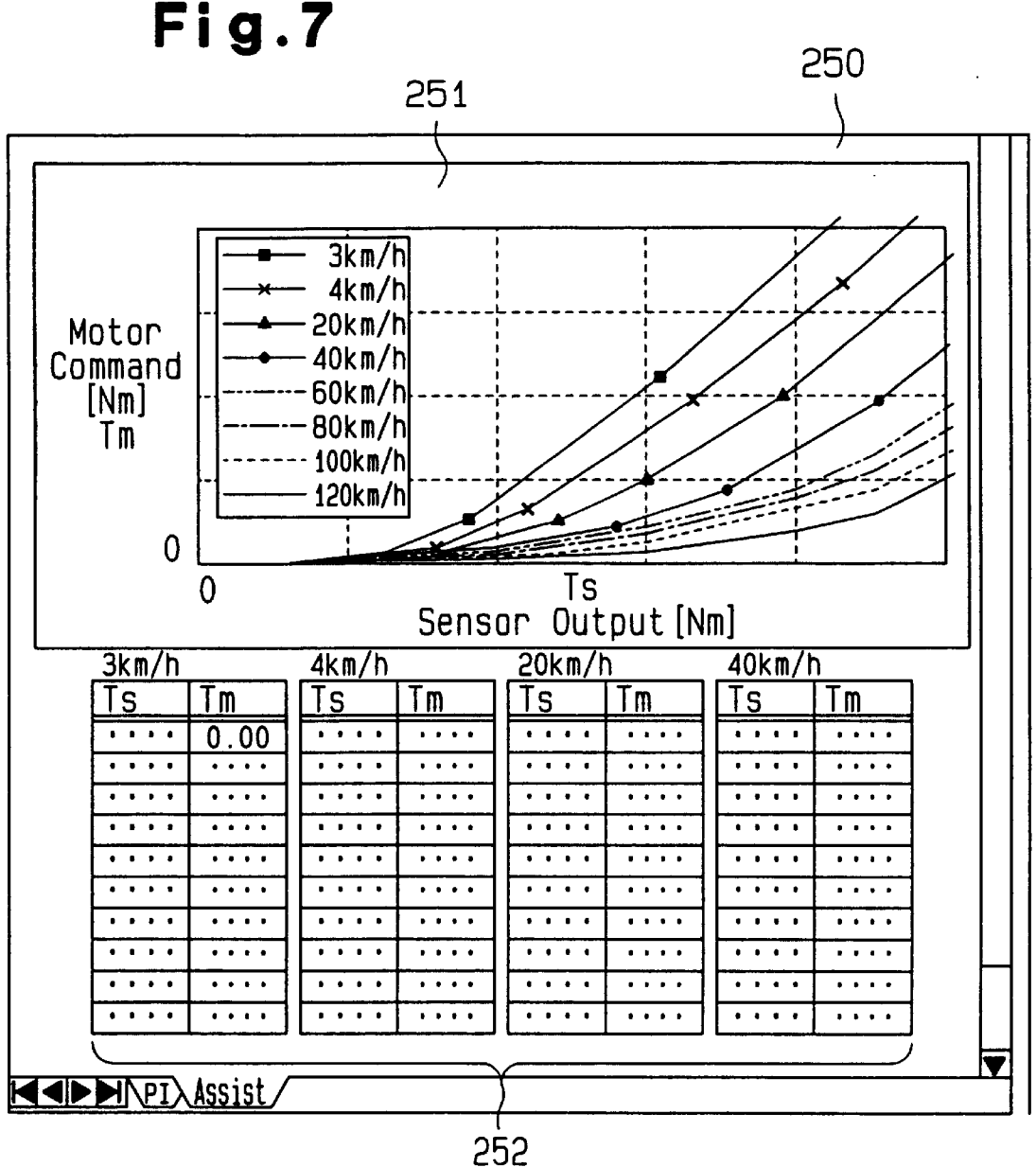
FIG. 7 illustrates the display showing an assist map.

FIG. 7 shows a window 250 of the display 150 when it shows the assist map as the control parameter data. The window 250 includes a graph area 251, which shows a graph of the assist map, and a table area 252. Each cell of the table area 252 shows a number in the map and may be rewritten. When the number of each cell is rewritten, the CPU 110a performs a computation to incorporate the changed number in the graph and shows the changed graph in the graph area 251.

As described above, the operator is informed of the adjusting procedures of the control parameters C. Based on the informed procedures, the operator rewrites the numbers in cells as necessary. The CPU 110a stores the rewritten control parameter data in the first memory 120a.

Thereafter, the operator manipulates the input portion 130 such that the CPU 110a communicates with the ECU 20 to store the rewritten control parameter data in the EEPROM 25.

After adjusting the control parameters C in the above described manner, the operator performs steering of the vehicle to confirm the adaptation of the steering control apparatus (ECU) 20.

The first embodiment has the following advantages.

(1) The memory portion 120 stores the sensory evaluation data A, which is related to the steering of the steering wheel 1, and other data, such as the vehicle speed condition data B1. The vehicle speed condition data B1 is related to the sensory evaluation and represents an environment in which a particular sensory evaluation is obtained.

The memory portion 120 stores the control parameters C of the steering control apparatus 20 and procedures for adjusting the control parameters C. The control parameters C are related to the vehicle speed condition B1 and the sensory evaluation data. The control parameters C also represent the cause of the sensory evaluation under the current vehicle speed condition data B1. The stored procedures are used for eliminating the sensory evaluation.

The operator inputs the sensory evaluation data A and the vehicle speed condition data B1 through the selector 140.

The apparatus 100 includes the CPU 110a (reading means) that reads a procedure for adjusting the control parameters C based on the inputted sensory evaluation data A and the vehicle speed condition data B1.

Further, the apparatus 100 includes the display 150 (output means) for displaying the selected procedure for adjusting the control parameters C.

As a result, the operator can easily obtain a concrete procedure for adjusting the control parameters C to obtain an appropriate steering feeling. That is, the operator can adjust the steering feeling in a short period.

(2) The memory portion 120 stores procedures for adjusting the control parameters C and the first steering feeling, which will occur when the selected procedure is executed. Also, the CPU 110a reads and displays the adjusting procedures and the first steering feeling on the display 150.

As a result, the operator is quickly informed with a concrete adjusting procedure and a steering feeling that will occur when the selected procedure is applied to the steering control apparatus 20.

(3) The memory portion 120 stores procedures for adjusting the control parameters C and the second steering feeling, which will occur if a procedure that is opposite to the selected procedure is executed. Also, the CPU 110a reads and displays the adjusting procedures and the second steering feeling on the display 150.

As a result, the operator is informed with the concrete procedure and can confirm the steering feeling that will occur if a procedure that is opposite to the selected procedure is executed.

(4) When functioning as the control parameter adaptor, the control parameter adjusting informing apparatus 100 reads the control parameter data from the ECU 20 and shows a graph of the control parameter data. This permits the operator to easily change the control parameter while watching the graph.

The EEPROM 25 is directly accessed when the control parameter data is read. Therefore, the time required for changing the control parameter, or time for inputting data and compiling, is shortened. Also, input errors are prevented.

The receiver 160 functions as control parameter inputting means, which inputs control parameter data from the steering control apparatus 20. The transmitter 170 functions as control parameter outputting means, which outputs rewritten or changed control parameter data to the steering control apparatus 20. The input portion 130 functions as a rewriting means, which is used when the control parameter data is rewritten.

A system for informing procedures for adjusting parameters of an electric power steering control apparatus according to a second embodiment of the present invention will now be described with reference to FIGS. 13 to 15.

Figure 13:
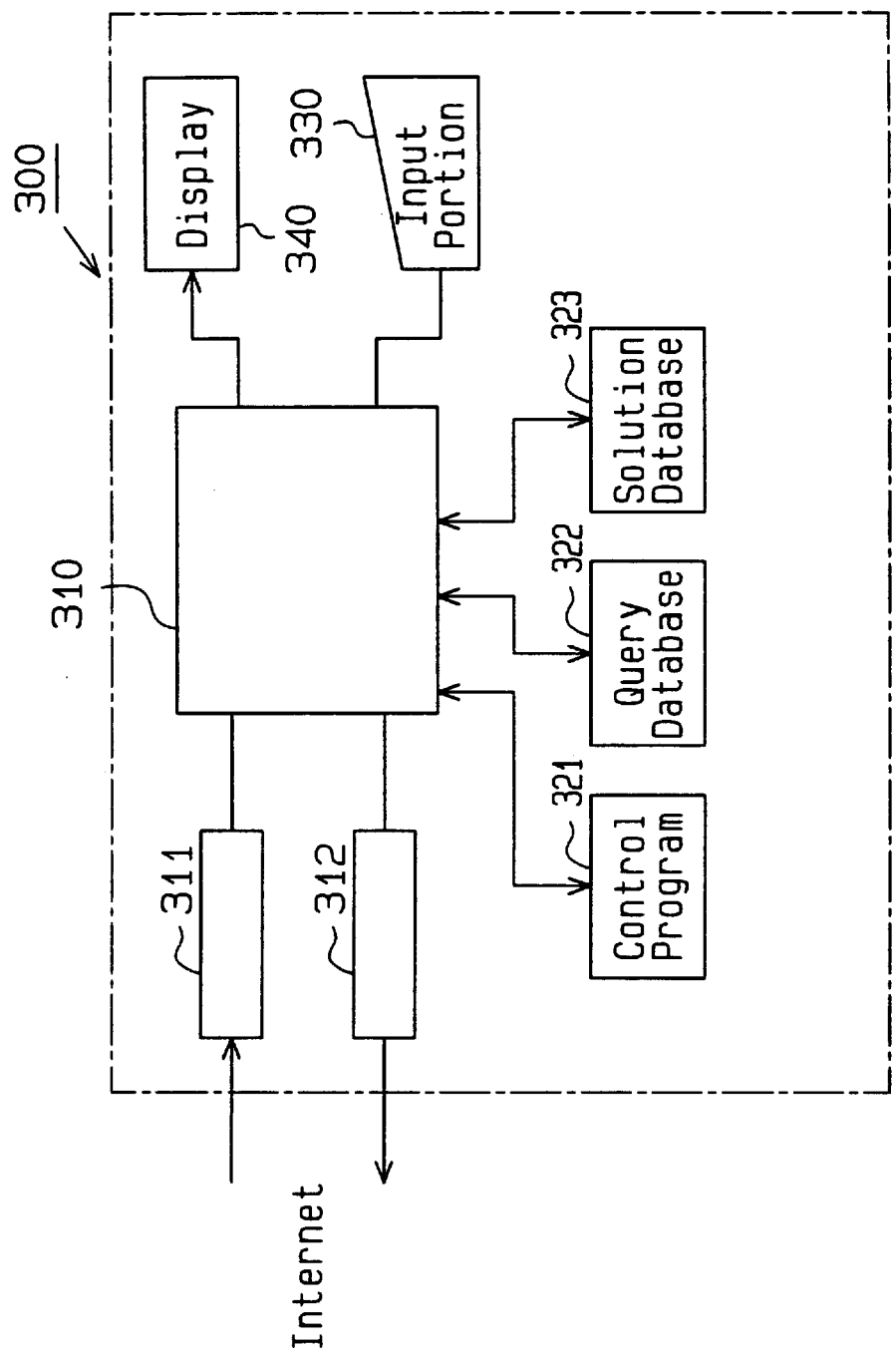
FIG. 13 is an electric block diagram illustrating a host computer according to a second embodiment.
Figure 14:
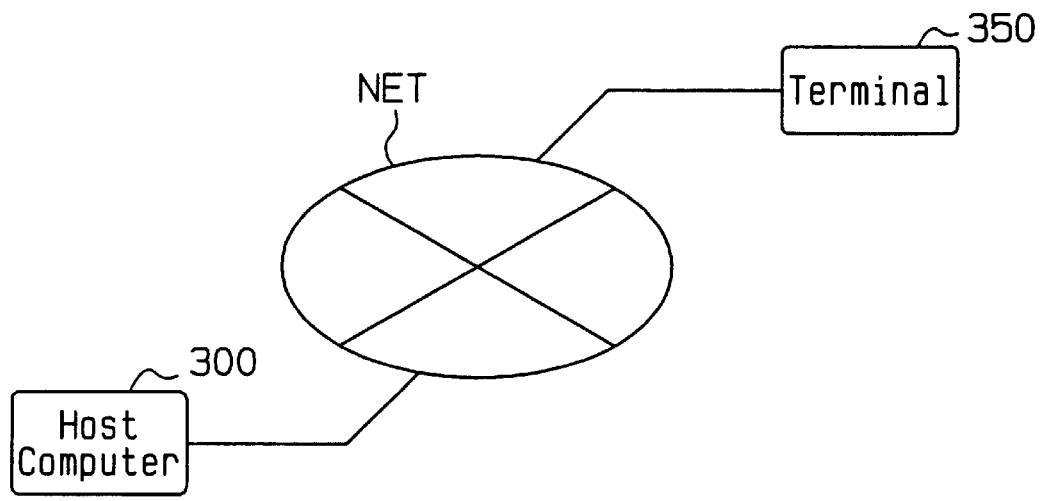
FIG. 14 is a diagram showing the internet of the informing system according to the second embodiment.
Figure 15:
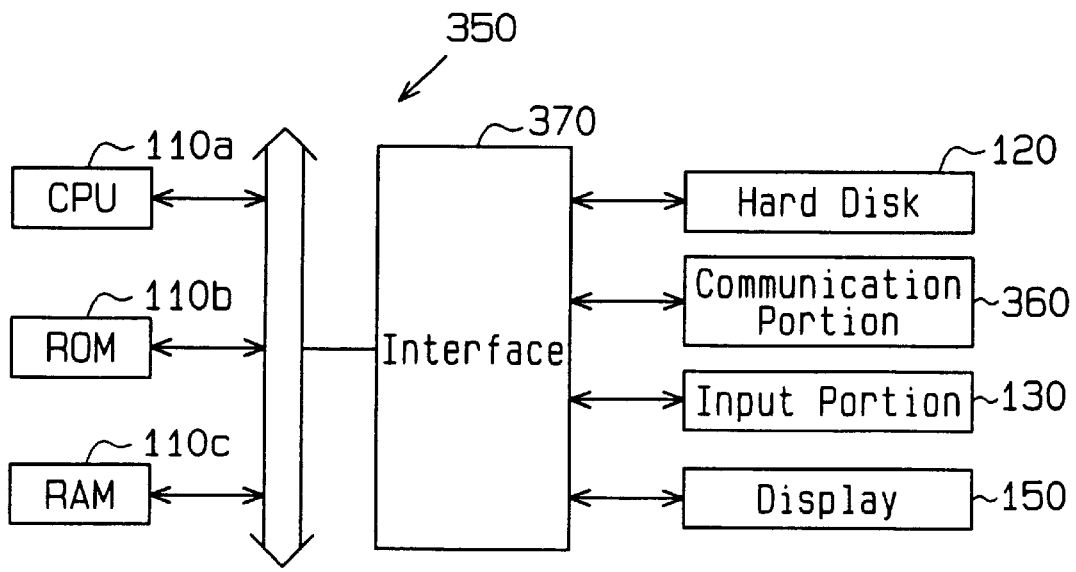
FIG. 15 is an electric block diagram illustrating a terminal of the informing system according to the second embodiment.

The informing system of the second embodiment includes a host computer 300, which is shown in FIGS. 13 and 14.

As shown in FIG. 14, the host computer 300 is connected to the internet NET through a path controller and telephone lines (neither is shown). A computer terminal 350, which is an A4-size notebook personal computer, is mounted on the vehicle. The terminal 350 is connected to the internet NET through the telephone lines by the radio communication portion 360. The numeral 370 represents an interface.

Since the hardware construction of the terminal 350 is the same as that of the first embodiment, the same reference numerals are given to those components that are the same as the corresponding components of the first embodiment. Although not illustrated, the terminal 350 has the receiver 160 and the transmitter 170. Thus, as in the first embodiment, the terminal 350 can communicate with the electric power steering control apparatus (ECU) 20. Also, the terminal 350 functions as a control parameter adapter.

As shown in FIG. 13, the host computer 300 has a CPU 310. The CPU 310 includes a read only memory (ROM), which stores system programs, and a random access memory (RAM). The CPU 310 performs various procedures according to application programs that are developed on the RAM. The CPU 310 is connected to an input portion 330 and a display 340.

A reception controller 311 controls data that is sent from the terminal 350 through the internet NET. A transmission controller 312 controls data that is sent to the terminal 350.

A first storage portion 321 stores various control programs such as an expert control program. A second storage portion 322 stores a query database similar to that of the first embodiment. A third storage portion 323 stores a solution database similar to that of the first embodiment.

In the second embodiment, the CPU 310 functions as reading means. The telephone lines and the internet NET correspond to a communication line. The reception controller 311 and the transmission controller 312 correspond to reception means and transmission means, respectively.

When the host computer 300 is connected to the terminal 350 through the internet NET, the CPU 310 detects the connection through the reception controller 311 and controls the terminal 350 according to a control program.

Specifically, upon reception of a command signal from the terminal 350, the host computer 300 initiates the expert control program and sends necessary data based on various command signals from the terminal 350.

Based on a specific demand signal, the host computer 300 sends the sensory evaluation shown in FIG. 4 and data for displaying the input window 180 of the steering condition to the terminal 350. The operator inputs necessary sensory evaluation and various condition data through the terminal 350, which then sends the inputted data to the host computer 300. The CPU 310 retrieves the query database 322 and the data of the procedure list window 190 to the terminal 350. The CPU 310 also sends the result of retrieval, which is shown on the list 191 of the procedure list window 190 to the terminal 350. The terminal 350 shows the retrieval result and the data on the display 150.

Then, the control parameters C that are selected in the procedure list window 190 are sent to the host computer 300 from the terminal 350. The host computer 300 retrieves an adjusting procedure that is related to the selected control parameters C from the adjusting procedure database. Then, the host computer 300 sends data of the solution window 200 related to the adjusting procedure and adjusting procedure data, which is the retrieval result to be shown in the adjusting procedure box 201 to the terminal 350. The terminal 350 shows information relevant to the received data on the display 150.

The CPU 310 retrieves first and second steering feelings that are related to the retrieved adjusting procedure from the steering feeling database and sends the retrieval result to the terminal 350. As in the first embodiment, the sent data is shown in the display areas 202a, 202b, which are located at appropriate positions on the graph box 202.

As a result, the operator is quickly informed of a procedure to adjust the control parameters C based on the displayed information.

The second embodiment has the following advantages.

(1) The data of procedures for adjusting the control parameter data is transmitted through the internet NET. Therefore, the adjusting procedure data can be centrally controlled. Accordingly, databases that include the adjusting procedure data can be easily modified.

(2) As in the first embodiment, the third storage portion 323 stores the procedure for adjusting the control parameters C and the first steering feeling data, which will occur when the selected procedure is applied. The CPU 310 reads the adjusting procedure and the first steering feeling.

The transmission controller 312 transmits the adjusting procedure and the first steering feeling data. As a result, the adjustment is performed according to a concrete adjusting procedure. When the procedure is applied to the apparatus 20, the operator will quickly understand the adjusting procedure and the steering feeling.

(3) As in the first embodiment, the third storage portion 323 stores the procedures for adjusting the control parameters C and the second steering feeling data, which will occur if a procedure that is opposite to the selected procedure is applied. The CPU 310 reads the adjusting procedure and the second steering feeling, and the transmission controller 312 transmits the adjusting procedure and the second steering feeling.

As a result, the operator can confirm a concrete adjusting procedure and will be informed of the conditions that will occur if a procedure that is opposite to the selected procedure is applied.

It should be apparent to those skilled in the art that the present invention may be embodied in many other specific forms without departing from the spirit or scope of the invention. Particularly, it should be understood that the invention may be embodied in the following forms.

(1) In the first embodiment, the data is displayed on the display 150. However, the data may be printed.

(2) In the second embodiment, the data is transmitted through radio, public telephone lines and the internet NET. However, the data may be transmitted through portable phone system or satellite communication.

Therefore, the present examples and embodiments are to be considered as illustrative and not restrictive and the invention is not to be limited to the details given herein, but may be modified within the scope and equivalence of the appended claims.

What is claimed is:

1. An informing apparatus for informing procedures for adjusting control parameters used in a control apparatus that controls an electric power steering apparatus based on various control parameter data, wherein the power steering apparatus is used for the steering wheel of a vehicle, the informing apparatus comprising:

storing means for storing various data, wherein the various data includes:
evaluation data, which is related to steering of the steering wheel;
steering state data, which represents the steering state when the evaluation data is obtained, the steering state data being related to the evaluation data;
control parameter data of the power steering control apparatus, wherein the control parameter data is related to the steering state data and the evaluation data, and is being used when the evaluation data is obtained; and
adjusting procedure data for adjusting the control parameter data such that the evaluation data is resolved;

first input means for inputting the evaluation data;

second input means for inputting the steering state data;

reading means, which reads the adjusting procedure data of the control parameter data from the storage means based on the evaluation data and the steering state data; and output means for outputting the adjusting procedure data of the read control parameter data.

2. The informing apparatus according to claim 1, wherein the storage means stores a first data together with the adjusting procedure data of the control parameter data, the first data being related to the steering feeling of the steering wheel that will occur if the adjusting procedure of the adjusting procedure data is applied;

wherein, when reading the adjusting procedure data, the reading means reads the first steering feeling data together with the adjusting procedure data; and wherein, when outputting the adjusting procedure data, the output means outputs the first steering feeling data together with the adjusting procedure data.

3. The informing apparatus according to claim 2, wherein the storage means stores a second data together with the adjusting procedure data of the control parameter data, the second data being related to the steering feeling of the steering wheel that will occur if a procedure that is opposite to the adjusting procedure of the adjusting procedure data is applied instead of the adjusting procedure of the adjusting procedure data;

wherein, when reading the adjusting procedure data, the reading means reads the second steering feeling data together with the adjusting procedure data; and wherein, when outputting the adjusting procedure data, the output means outputs the second steering feeling data together with the adjusting procedure data.

4. The informing apparatus according to claim 1, wherein the output means includes a display that displays data that is read by the reading means.

5. The informing apparatus according to claim 1, wherein the electric power steering apparatus includes a motor, which generates force for assisting rotation of the steering wheel, a transmission mechanism, which transmits rotation of the motor to the steering wheel, and a drive circuit for controlling the motor.

6. The informing apparatus according to claim 5, wherein the steering wheel is coupled to a steering shaft, and wherein the transmission mechanism includes a driven gear, which is attached to the steering shaft, and a drive gear, which is attached to the motor, the drive gear being meshed with the driven gear.

7. An informing system for informing procedures for adjusting control parameters used in a control apparatus that controls an electric power steering apparatus based on various control parameter data, wherein the power steering apparatus is used for the steering wheel of a vehicle, the informing system comprising:

storing means for storing various data, wherein the various data includes:

evaluation data, which is related to steering of the steering wheel;

steering state data, which represents the steering state when the evaluation data is obtained, the steering state data being related to the evaluation data;

control parameter data of the power steering control apparatus, wherein the control parameter data is related to the steering state data and the evaluation data, and is being used when the evaluation data is obtained; and adjusting procedure data for adjusting the control parameter data such that the evaluation data is resolved;

reception means for inputting the evaluation data and the steering state data through a communication line;

reading means, which reads the adjusting procedure data of the control parameter data from the storage means based on the evaluation data and the steering state data; and transmission means for outputting the adjusting procedure data of the read control parameter data through a communication line.

8. The informing system according to claim 7, wherein the storage means stores a first data together with the adjusting procedure data of the control parameter data, the first data being related to the steering feeling of the steering wheel that will occur if the adjusting procedure of the adjusting procedure data is applied;

wherein the reading means reads the first steering feeling data together with the adjusting procedure data; and wherein the transmission means outputs the first steering feeling data together with the adjusting procedure data.

9. The informing system according to claim 7, wherein the storage means stores a second data together with the adjusting procedure data of the control parameter data, the second data being related to the steering feeling of the steering wheel that will occur if a procedure that is opposite to the adjusting procedure of the adjusting procedure data is applied instead of the adjusting procedure of the adjusting procedure data;

wherein the reading means reads the second steering feeling data together with the adjusting procedure data; and wherein the transmission means outputs the second steering feeling data together with the adjusting procedure data.

10. The informing system according to claim 7, wherein the electric power steering apparatus includes a motor, which generates force for assisting rotation of the steering wheel, a transmission mechanism, which transmits rotation of the motor to the steering wheel, and a drive circuit for controlling the motor.

11. The informing system according to claim 10, wherein the steering wheel is coupled to a steering shaft, and wherein the transmission mechanism includes a driven gear, which is attached to the steering shaft, and a drive gear, which is attached to the motor, the drive gear being meshed with the driven gear.

* * * * *